Oct. 23, 1956  H. O. ANDERSON  2,767,763
JOGGLE PUNCH AND DIE SETS
Filed April 13, 1953  3 Sheets-Sheet 1

INVENTOR.
HERBERT O. ANDERSON
BY
Reynolds, Beach + Christensen
ATTORNEYS

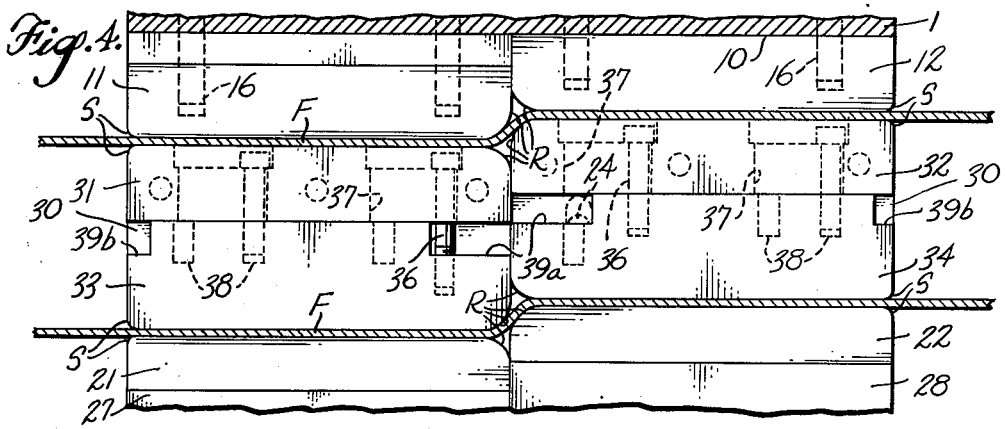
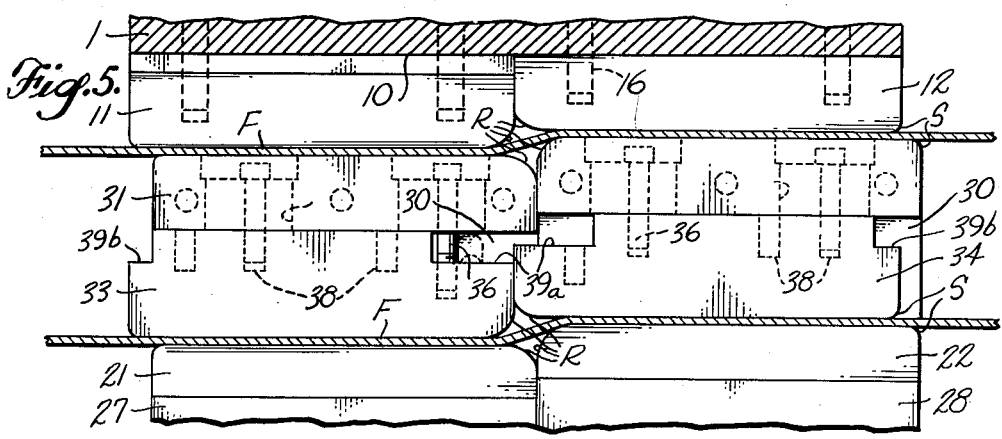
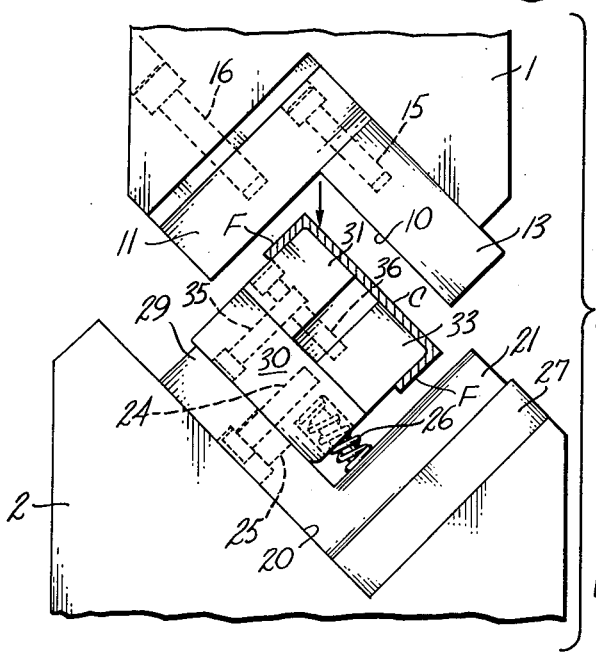
INVENTOR.
HERBERT O. ANDERSON
BY Reynolds, Beach & Christensen
ATTORNEYS Oct. 23, 1956 H. O. ANDERSON 2,767,763
JOGGLE PUNCH AND DIE SETS
Filed April 13, 1953 3 Sheets-Sheet 3

INVENTOR.
HERBERT O. ANDERSON
BY
Reynolds, Beach & Christensen
ATTORNEYS

United States Patent Office 2,767,763
Patented Oct. 23, 1956

2,767,763

JOGGLE PUNCH AND DIE SETS

Herbert O. Anderson, Seattle, Wash., assignor to Boeing Airplane Company, Seattle, Wash., a corporation of Delaware Application April 13, 1953, Serial No. 348,362

9 Claims. (Cl. 153—21)

Joggling of frame members in locations where two such frame members join and overlap, for the purpose of maintaining smooth continuity of contour when a skin is later applied over the spliced joint, has long been practiced, especially in the construction of aircraft and the like. Joggling is particularly desirable where the spliced frame members are of rolled or extruded shapes and their webs and flanges are thicker than sheet metal shapes, and where in consequence the overlapping of one flange or web upon another would otherwise produce quite an appreciable and abrupt difference in level. The thicker and more complex the sections to be overlapped, the more necessary is the joggling, yet the more difficult it becomes to displace the end of a flange, for example, with respect to the remainder thereof without causing buckling of the angled web at the joggle, especially if the web also is thick or of complex section. In such cases the joggle must extend over an appreciable longitudinal extent, and each bend in the flange must be about a fairly gentle curvature; this leaves the applied skin, over the gap between the unjoggled portion of the one frame member and the end of the spliced frame member where it seats at the outer bend of the joggle, quite unsupported, and often this is not desirable. On the other hand, thin flanges can usually be bent quite abruptly, and the longitudinal extent of the joggle can be negligible, which is often desirable.

It can be seen that there are many and varied degrees of abruptness of joggle, of curvature at the bends, of depth and of the longitudinal extent of the joggle, and of the displacement in the lateral sense of the joggle, and it is desirable to provide readily for such variations in any punch and die set of a size and shape to joggle a given shape or frame member, in order to avoid the necessity of providing multiple sets, alike in all respects except in the individual characteristics just mentioned. It is an important object of this invention to provide a punch and die set which for any given size and shape is capable of ready adjustment or rearrangement to vary at will and in small degrees not only the depth of the joggle but also and particularly the length and abruptness thereof, and to vary in all necessary respects the abruptness of curvature at the bends, and the sense of the offset or joggle, to one side or the other.

The Turton Patent No. 2,310,498 of February 9, 1943 discloses a joggling machine, primarily for joggling angle shapes, and such are the shapes usually joggled heretofore, for it is necessary to offset or joggle only a single flange and to maintain flat the adjoining web, and no thought need be given to the identical and simultaneous joggling of a second flange spaced from the first, as would be the case were the frame member of channel shape. Nevertheless, channel shapes are coming into wide use as frame members, and a machine and method must be provided to joggle its two spaced-apart flanges identically and simultaneously, without buckling its web at the joggle, and this is a primary object of this invention. In this connection it is to be noted that the present invention concerns the joggling of the two flanges, and while Turton suggests the joggling of a channel shape, his disclosure is applicable only to the joggling of the web of such a channel, and would be inapplicable to the joggling of the channel's two flanges.

More specifically, by the present invention there are provided two punch-supported working blocks for engagement with the exterior of one flange, relatively offset to one side or the other, at will, in the direction of the channel's web, and two die-supported working blocks for engagement with the exterior of the second flange, these also being relatively offset in the same direction but respectively oppositely to the first two working blocks, and being offset additionally in the longitudinal direction from the corresponding and opposite working blocks by an selected distance, from no more than the thickness of the flanges if a very abrupt joggle is required, to a maximum spacing such as will produce a quite gentle joggle. These working blocks are fixedly held in the desired positions of adjustment, and since the two flange-engaging corners of each block are of gentler or more abrupt curvature, respectively, such blocks can be reversed end-for-end to vary also the abruptness of curvature at each end. Since the four working blocks, engaging only the exterior surfaces of the opposite flanges of the channel member to be joggled, can not transmit force across the space between the interior surfaces of the flanges, filler blocks are provided to fill in this space at opposite sides of and at the joggle. These filler blocks, four in number, are relatively offset longitudinally in correspondence with the longitudinal offset of the working blocks with which they respectively cooperate, but being yieldably supported for offsetting in the direction of the web's plane, they can be aligned initially within the straight channel, but can offset as they are engaged between the corresponding die-supported and punch-supported working blocks, all the while supporting the interior of the channel's flanges. In addition the filler block assembly serves to back up the interior surface of the channel's web, while the latter is engaged exteriorly by a clamping member, between which the web is clamped with sufficient force to prevent buckling of the web during joggling.

Further objects of the invention will appear as this specification progresses.

The invention is illustrated in the accompanying drawing in a single representative form, for joggling the two flanges of a simple channel member, although adjusted and rearranged to illustrate the various possible kinds and degrees of joggling of which it is capable. It is not intended to restrict the invention by such showing nor by this specification to any particular cross-sectional shape nor to any given degree of joggle, otherwise than is required by the limitations expressed in the claims.

Figure 3 is an end elevation similar to Figure 2, but with parts in their initial positions, preceding joggling.

Figure 2:
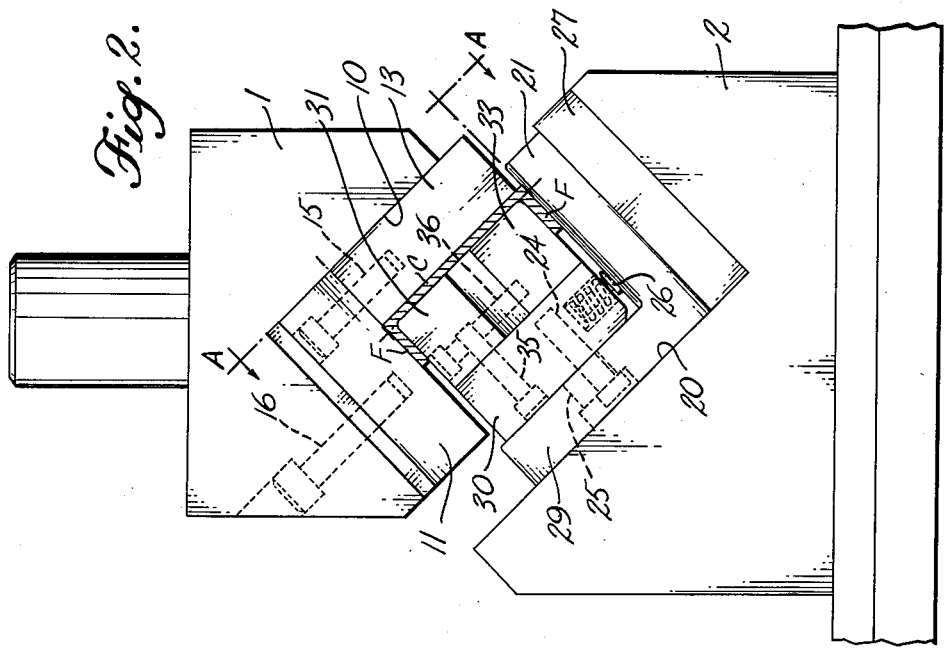
Figure 2 is an end elevation of the set, closed, and with a channel operatively engaged therein, as at the end of the joggling operation.
Figure 1:
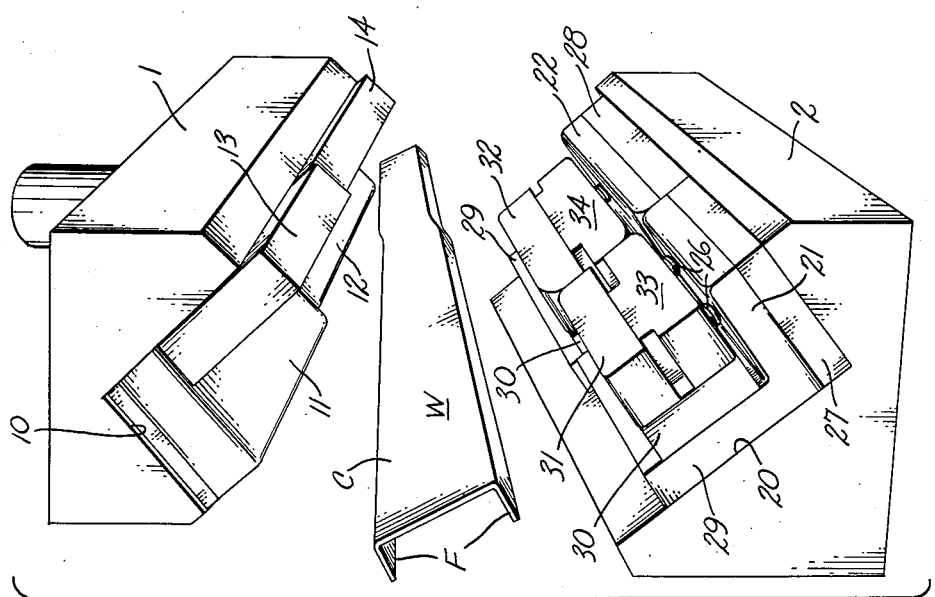
Figure 1 is a perspective view from an end of a punch and die set incorporating the principles of the invention, widely or exaggeratedly opened, and with the joggled channel separate but shown in the relative position it would occupy during joggling.

Figures 4 to 8 inclusive are longitudinal elevational views of the punch and dies set taken from the viewpoint shown in Figure 2 at A—A (the filler assembly's backing face otherwise defining the line of division), all showing the die closed and the joggle completed, but illustrating different ones of the various modifications of longitudinal offset, curvature, lateral sense of the joggle, and abruptness of joggle possible with a single punch and die set.

The invention will be described as the working parts would be set up for joggling a simple channel section C, having flanges F and web W, after which it will be readily apparent how like principles may be applied in the joggling of less common sections, or of sections other than channels. No restrictions in the application of the invention are to be implied from the specific terms used for ease of understanding in describing this illustrative embodiment.

The head 1 of the ram or punch is formed with a right-angled notch 10 in its under face, within which are supported two working blocks 11, 12, one, the block 11, being higher than the other, and corresponding clamping blocks 13, 14 disposed at right angles to the working blocks, and secured thereto as by the screws 15. The working blocks are secured fixedly but for ready removal by screws 16 to the punch head. The base or die part 2 is similarly notched at 20 in its upper face and supports two working blocks 21, 22 from the side of the notch 20 which faces the working faces of blocks 11 and 12, so that the higher die-supported working block 22 faces the lower punch-supported working block 12, as 21 faces 11, the projection or difference in level being the same but opposite in each instance. Although not shown, mounting screws similar to the screws 16 but providing for longitudinal adjustment, as described later with reference to the filler block assembly, would be employed to hold the die-mounted working blocks 21, 22 in fixed position, and at the same time permitting their ready dismounting and remounting, and their shifting longitudinally. Shims, such as those at 27 and 28, may be used to produce or to vary the extent of projection of the respective blocks 21, 22, and might similarly be used in conjunction with the punch-supported blocks 11, 12. Such shims might also be used to adapt the apparatus, with appropriate change in the filler blocks later to be described, to operate upon channels of different web depth.

It is preferred that the working blocks 21, 22 be of angular shape or in any event be in effect integral with base plates 29 which rest upon the face of the notch 20 which is at right angles to the face whereon the working blocks 21, 22 or their shims 27, 28 rest. These base plates constitute the base or support for a channel-filling assembly of four filler blocks 31, 32, 33 and 34, through the intermediary mounting plates 30 to which these filler blocks are fixed in pairs, blocks 31, 33 to one mounting plate 30, and blocks 32, 34 to another (not shown). Such affixation is by means of mounting screws 35 through the mounting plate 30 into the block 31 or 32, as the case may be.

The filler blocks 33 and 34 abut at their inner ends and are conjointly offsettable or shiftable longitudinally relative to the respective abutted filler blocks 31 and 32, and by quite appreciable distances. To this end the shanks of adjusting screws 36 pass through longitudinal slots 37 in filler blocks 31 and 32 and are threaded in a selected hole 38 in the respective filler blocks 33 and 34. By sliding the screws 36 along the slots 37, and by selection of a properly located hole 38 a wide range of offset of block 33 relative to block 31 with which it is paired, and of block 34 relative to its paired block 32, is possible, from the substantially zero offset represented in Figures 4 and 8 through the intermediate offset of Figure 5 to the substantially maximum offsets represented in Figures 6 and 7. However, to the extent that the filler block assembly is offset the corresponding working blocks must also be offset. The end of working block 11 which abuts the end of working block 12 is kept in transverse alignment with the end of filler block 33 which abuts the end of filler block 34, and the abutted ends of working blocks 21 and 22, offset as they are from the abutting ends of blocks 11 and 12, are kept in transverse alignment with the abutting ends of filler blocks 31, 32. The manner of effecting such relative offsetting of the filler blocks 33 and 31, 34 and 32 may correspond mechanically to the manner in which the filler blocks are offset, as, for example, by receiving the shank of mounting screws 16 in selected holes in 11 and 12, and sliding it in slots in the base 2, and the description above will suffice for both.

Each subassembly consisting of a pair of filler blocks 31 and 33, or 32 and 34, and its intermediary mounting plate 30, is resiliently yieldably mounted upon and for movement relative to the corresponding base plate 29, in a direction parallel to the clamping face of clamping plate 13 or 14 and transversely of the channel, that is to say, in the direction of the joggle. Guide screws 24 have their shanks received in slots 25 in the base plate 29 which extend as guides in the proper direction, and are threaded into the intermediary mounting plate 30. Compression coil springs 26 react between the working blocks 21 or 22 and plates 30, tending to maintain the filler block subassemblies spaced from such working blocks, as can be seen in Figure 3. The two subassemblies can be brought into longitudinal alignment when a channel C is fitted upon them, as in Figure 3, and yet they can both be depressed, one more than the other at the completion of the joggling operation, as in Figure 2.

It is to be noted that the outer faces of the several filler blocks cooperate to define a planar backing surface which contacts the inner face of the channel's web W, and cooperates with the clamping face of the clamping blocks 13, 14 which engages the web's outer face, to subject the web to enough restraint to prevent its buckling during joggling. This clamping force is the result of the notched arrangement of the punch head 1 and the die's base 2; a downward force on the ram, as indicated by the arrow in Figure 3, first clamps the web W between clamping plates 13 and 14 and the backing face of the filler block assembly, and then displaces the filler blocks to effect joggling under the pressure of the working blocks 11, 12 and the reaction of the working blocks 21, 22, as the filler blocks transmit that pressure.

It will be observed that the inner (abutted) corners of all the blocks, the filler blocks and the working blocks alike, are curved differently from the outer corners thereof. However, whereas in all views except Figure 8 the more gently rounded corners R are innermost, in Figure 8 the blocks have been dismounted, reversed end for end, and remounted, as compared for example with Figure 4, and now the sharper corners S are innermost. This interchange of the corners, which is readily accomplished, is all that is needed to vary the sharpness or abruptness of the curvature of the joggle, particularly when the length of the joggle is a minimum, and need not affect any other characteristic of the joggle. The longitudinal extent of the joggle is governed by the extent of longitudinal offsetting of the blocks, in the manner already explained, and as will be clear by comparing the minimum or most abrupt joggle of Figure 4, wherein the offset is substantially zero, or Figure 8, wherein it is only enough to accommodate the thickness of the flanges F, with the maximum length of joggle in Figures 6 and 7, wherein the offset is the greatest possible, or with the intermediate length of joggle and offset in Figure 5. The depth of the joggle is controlled by selection of working blocks of the proper projection, or by the use of shims, as has already been explained.

The filler blocks 33, 34 are notched at their ends, as shown at 39a and 39b, so that the longitudinally offset block 33 or 34 will not interfere with the overhanging end of block 32 or 31, as the case may be, during joggling.

Figure 6:
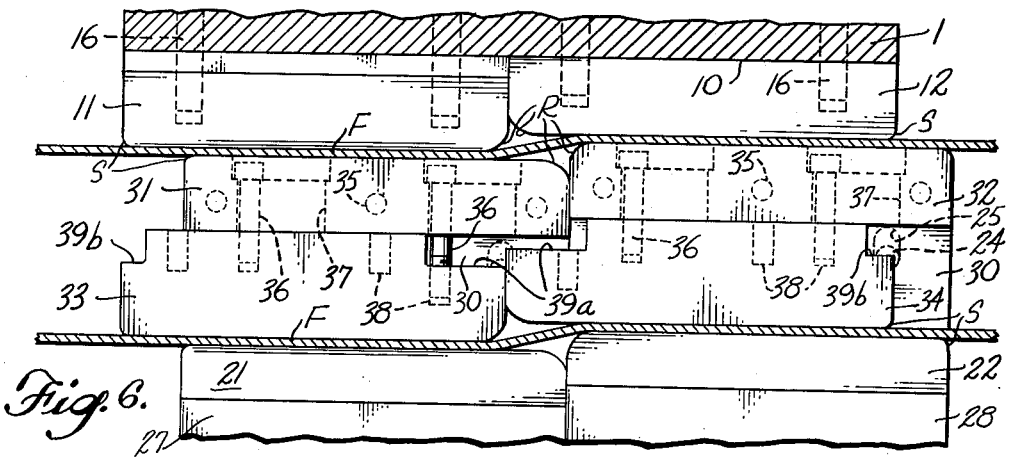
Figure 7:
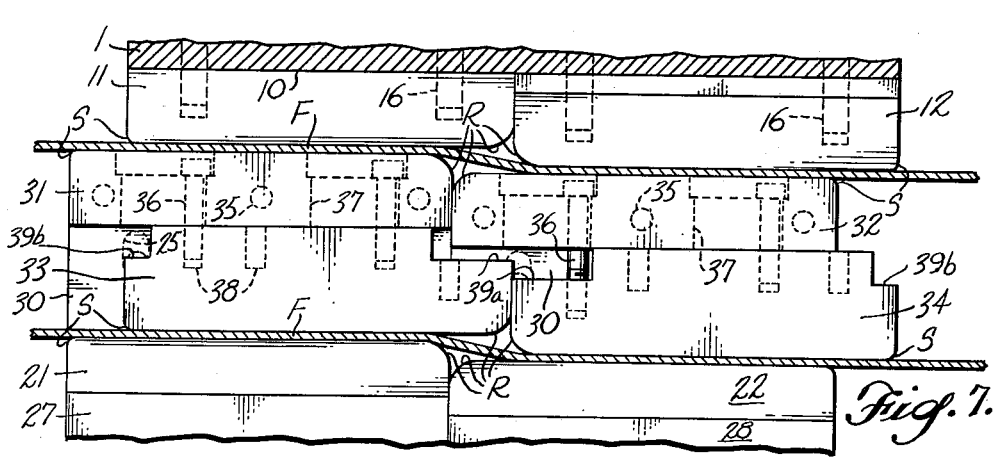
Figure 8:
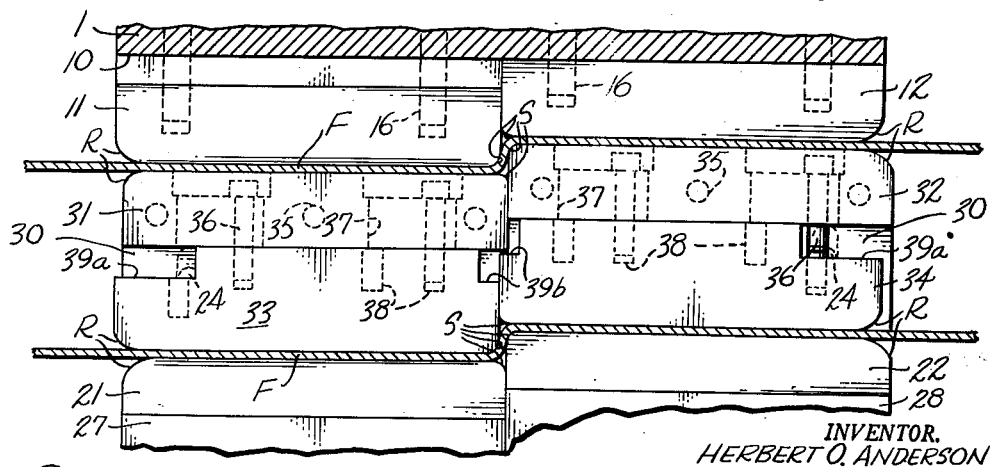

Comparison of Figures 6 and 7 will show that the joggle is to one side in one case, and to the opposite side in the other case. This is accomplished by dismounting, rotation through 180° of the entire punch and die set, including the filler blocks, and remounting again, or by reversal of shims. Although the joggle has been shown in these figures of maximum length and minimum abruptness, this has no bearing upon the reversal of the joggle to the opposite side, nor vice versa.

The operation will require the choosing of a punch and die set, including filler blocks, of correct shape and size to fit the channel C or other shape which is to be joggled. The filler block assembly must fit snugly between the inner faces of the flanges F and against the inside of the web W. The several blocks must be preset to accomplish whatever length, depth, and abruptness of curvature is desired, and to whichever side is correct. Now the channel or other shape to be joggled is fitted over the filler block assembly, in correct longitudinal disposition to locate the bending or forming corners R or S at the correct place, and the ram is moved downwardly towards the die parts, as indicated by the arrow in Figure 3. The web is first clamped, then the downward pressure displaces the filler block assembly downwardly and to the right, compressing the springs 26, and transmitting pressure from the working blocks 11, 12 through the filler blocks 31 and 33, 32 and 34, respectively, to the working blocks 21, 22. The high block 11 offsets or joggles both flanges F simultaneously and to the same side, in the same amount, until stopped by the block 21; meanwhile the channel beyond the joggle is being clamped between blocks 12, 32, 34 and 22. The bending of the flanges F takes place about the forming corners R or S, at the distances determined by the offsets of the cooperating blocks. Meanwhile the web W is being clamped, and the clamping component of the force can be determined by selecting or adjusting (as with shims) the angle of the clamping block 13 to the direction of closure of the die. This clamping restrains and prevents buckling of the web during joggling.

I claim as my invention:

1. In an apparatus for producing a joggle in the flanges of a metal channel, while keeping the web thereof planar, a punch and die set one whereof is formed with a clamping block formed with a planar clamping face for engagement with the channel's web, and each of the punch and die including two working blocks positioned with their forming faces at such angle to the clamping face of said clamping block as corresponds to the angle of the channel's flanges to its web, means fixedly supporting the two punch-supported working blocks with one thereof projected, in a direction parallel to the plane of the clamping face, relative to the other punch-supported working block, and both with their working faces disposed to engage one flange of the channel, means fixedly supporting the die-supported working blocks similarly but oppositely projected, complementally to the punch-supported blocks, and both with their working faces disposed to engage the second flange of the channel, said supporting means for the several working blocks also fixing the forming corners of the respective projected blocks at a selected offset distance longitudinally of the die set, a composite channel-filling assembly positioned intermediate the punch and the die, of a size to engage inside the channel's flanges, means supporting said assembly from that one of the punch and die which does not carry the clamping block, for movement relative to its said support in a direction parallel to the plane of the clamping face, said assembly defining a substantially planar backing face parallel to and engageable with the inner face of the channel's web, so that in cooperation with the clamping face of the clamping block it will restrain buckling of the channel's web, and said assembly comprising four filler blocks, each of which is disposed opposite its respective one of the four working blocks for cooperative clamping engagement with the respectively interposed portions of the channel's flanges, and each of which has a forming corner adjacent the forming corner of the cooperating working block, means fixing together the pair of laterally adjacent filler blocks at one end of the assembly, in longitudinally offset relationship reversed from but corresponding in amount to the offset of the respective working blocks, means similarly fixing together the other pair of laterally adjacent filler blocks at the other end of the assembly, in similar but oppositely offset relationship, and separate resiliently yieldable means supporting each pair of filler blocks from their supporting punch or die, as the case may be, for displacement of the respective pairs from an initial aligned disposition into a relatively oppositely projected disposition corresponding to the projection of the corresponding working blocks, upon approach of the punch and die in the direction parallel to the backing face, to joggle the channel's flanges about the appropriate forming corners of the working and filler blocks.

2. Apparatus as and for the purpose stated in claim 1, wherein the punch and die set are oriented, relative to the direction of their approach, at an angle to the clamping face, whereby to produce by such approach an initial component force clamping the channel's web between the clamping face and the backing face of the assembly, and thereafter to produce a flange-displacing force in the direction parallel to the clamping face.

3. Apparatus as and for the purpose stated in claim 1, wherein each filler block, at each flange-engaging corner, is formed with a forming corner, the forming corners at their inner ends, when assembled in a given relationship, being of a different degree of abruptness of curvature than the corners at their outer ends, and the assembly-supporting means being releasable for disassembly of the filler blocks from such given relationship and reassembly thereof in a different relationship, with their initially outer corners innermost, to effect a joggle of a different degree of abruptness.

4. Apparatus as and for the purpose stated in claim 1, wherein the means for supporting the several working blocks and the means for supporting the filler-block assembly are releasable, and formed for shifting of the blocks relatively longitudinally and for fixation thereof in a different offset relationship, to effect a variation in spacing between the cooperating forming corners, and a corresponding variation in the length of the joggle.

5. Apparatus as and for the purpose stated in claim 1, including two mounting plates each having one face slidably engaged with one face of that one of the punch and die which does not carry the clamping block, being that face which is opposite said clamping block, one filler block of each pair being supported upon and secured in correct position to the respective mounting plates, and the other filler block of each pair being supported upon the same mounting plate but secured only to its paired block, in correct position relative to the latter.

6. Apparatus as and for the purpose stated in claim 5, including guide means guiding said mounting plates for movement, each with its filler blocks, in a plane parallel to the clamping block, resilient means urging said mounting plates towards the advancing punch-supported working blocks, and means to limit punch-induced movement of the mounting plates.

7. For use with a linearly reciprocative punch and die, a joggle-producing device for channels, of the nature described, comprising, in combination, two working blocks for securement to the punch with their forming faces in parallel planes, and offset in the general direction of reciprocation so that one leads the other and first engages the one flange of a channel to be joggled, two additional working blocks for securement to the die with their forming faces facing the punch-mounted blocks, and similarly disposed in parallel planes, but offset reversely in the general direction of reciprocation so that the one which faces the receded block of the punch-mounted blocks first engages the opposite flange of the channel, and likewise offset longitudinally by a given amount from the opposite punch-mounted blocks, a clamping block for mounting at an angular disposition to the working faces of the punch-mounted blocks which corresponds to the angle of the channel's web relative to its flanges, and having a planar face engageable with the channel's web during reciprocation, two mounting plates for support upon the die, opposite said clamping plate, means guiding said mounting plates for sliding in a plane parallel to the web-engaging face of the clamping plate, and disposed end to end in the vicinity of the joggle, a set of four filler blocks, each complemental to one of said working blocks, substantially filling the space between the channel's flanges and between its web and the mounting plates, and means to secure the set of filler blocks to the mounting plates in pairs, one pair upon each mounting plate, with each filler block generally opposite its corresponding working block and with their adjacent ends offset longitudinally in correspondence with but oppositely to the longitudinal offset of the working blocks, whereby upon approach of the punch to the die the clamping plate engages the channel's web to prevent its buckling and the leading punch-mounted working block engages the channel's flange and displaces the complemental filler block and its paired filler block, and their mounting plate, towards the receded die-mounted working block, to joggle the channel's flanges relative to the portion engaged by the several other working and filler blocks.

8. A joggle punch and die set as defined in claim 7, wherein the adjacent ends of certain of the filler blocks are recessed, whereby joggling approach of said filler blocks is possible notwithstanding longitudinal offsetting to the extent of overlapping blocks of one pair relative to blocks of the other pair.

9. A joggle punch and die set as defined in claim 7, wherein the working faces of the working blocks and the filler blocks are disposed at an angle to the direction of reciprocation, and the clamping block's web-engaging face and the guiding means for the mounting plates are correspondingly angularly disposed, said clamping block being mounted upon the punch.

References Cited in the file of this patent

UNITED STATES PATENTS

| 2,141,736 | Castle et al. | Dec. 27, 1938 |
| 2,310,498 | Turton | Feb. 9, 1943 |

FOREIGN PATENTS

| 8,082 | Great Britain | of 1909 |